(12) United States Patent
Boonekamp (10) Patent No.: US 9,279,568 B2
(45) Date of Patent: Mar. 8, 2016

(54) ILLUMINATION DEVICE, LUMINAIRE AND LIGHTING SYSTEM

(75) Inventor: Erik Boonekamp, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 292 days.

(21) Appl. No.: 13/880,082

(22) PCT Filed: Oct. 13, 2011

(86) PCT No.: PCT/IB2011/054527
§ 371 (c)(1),
(2), (4) Date: Apr. 18, 2013

(87) PCT Pub. No.: WO2012/056352
PCT Pub. Date: May 3, 2012

(65) Prior Publication Data
US 2013/0208480 A1    Aug. 15, 2013

(30) Foreign Application Priority Data

Oct. 28, 2010   (EP) .................................... 10189244

(51) Int. Cl.
*F21V 14/06* (2006.01)
*F21V 5/02* (2006.01)
*G02B 5/04* (2006.01)
*F21V 8/00* (2006.01)
*F21V 5/00* (2015.01)
*F21V 13/04* (2006.01)
*F21Y 101/02* (2006.01)

(52) U.S. Cl.
CPC ................. *F21V 14/06* (2013.01); *F21V 5/007* (2013.01); *F21V 5/008* (2013.01); *F21V 5/02* (2013.01); *F21V 13/04* (2013.01); *G02B 5/045* (2013.01); *G02B 6/0053* (2013.01); *F21Y 2101/02* (2013.01)

(58) Field of Classification Search
USPC ............. 362/97.1, 97.2, 97.3, 97.4, 620, 626, 362/544, 546, 326, 330, 331, 337, 339, 362
See application file for complete search history.

(56) References Cited

U.S. PATENT DOCUMENTS

| 2007/0064425 A1 | 3/2007 | Frecska |
| 2009/0274876 A1 | 11/2009 | Liou |
| 2010/0033954 A1 | 2/2010 | Boonekamp |

(Continued)

FOREIGN PATENT DOCUMENTS

| EP | 1586813 A1 | 10/2005 |
| JP | 1997269418 A | 10/1997 |

(Continued)

*Primary Examiner* — Laura Tso
(74) *Attorney, Agent, or Firm* — Meenakshy Chakravorty (57) ABSTRACT

An illumination device comprises a housing (5) with a plurality of compartments (3), each compartment comprising a respective light emission window (15), a light source (11), and a stack of crossed prismatic sheets (10). Light issued by the light source during operation is made to propagate through the prismatic sheets and subsequently through the light emission window. The orientation of the stack of sheets is different for each compartment, thus causing each compartment to issue a different beam of light. The light source of each compartment is separately switchable, thus enabling easy setting of the type of beam issued form the illumination device. Optionally a diffuser (17, 23) is provided at one side or at both sides of the stack of prismatic sheets to enhance the homogeneity of the issued light.

12 Claims, 5 Drawing Sheets

(56) References Cited

U.S. PATENT DOCUMENTS

2011/0205756 A1* 8/2011 Kim et al. .................... 362/607
2012/0268964 A1* 10/2012 Bastawros et al. ............ 362/606

FOREIGN PATENT DOCUMENTS

| | | | |
|---|---|---|---|
| JP | 2006269136 A | 10/2006 | |
| JP | 2007294191 A | 11/2007 | |
| JP | 2008159451 A | | 7/2008 |
| JP | 2010140889 A | | 6/2010 |
| WO | WO2008146229 A2 | | 12/2008 |
| WO | WO2008146232 A1 | | 12/2008 |
| WO | WO2008152561 A1 | | 12/2008 |
| WO | WO2009002853 A2 | | 12/2008 |
| WO | WO2009050598 A1 | | 4/2009 |
| WO | WO2009059461 A1 | | 5/2009 |
| WO | WO2009099547 A2 | | 8/2009 |
| WO | WO2009151944 A1 | | 12/2009 |

* cited by examiner

ILLUMINATION DEVICE, LUMINAIRE AND LIGHTING SYSTEM

FIELD OF THE INVENTION

The invention relates to an illumination device comprising a housing with at least a first compartment, the first compartment comprising a respective:
light emission window bordered by an outer edge of the compartment;
carrier for at least one light source;
stack of crossed prismatic sheets positioned in the housing, each prismatic sheet having a smooth side and a grooved side;
light issued by the light source during operation is made to propagate along a light path, said light path extending from the light source through the sheets and subsequently through the light emission window at least partially along a central axis transverse to the light emission window, both prismatic sheets being turned with the smooth side towards the light emission window.

The invention further relates to a luminaire and a lighting system in which such an illumination device is comprised.

BACKGROUND OF THE INVENTION

Such an illumination device is known from WO2009099547. The known illumination device has LEDs as a light source and is a thin double-collimating light distributing device for use in a variety of general lighting applications, especially those benefiting from a slim design. Output illumination from these slim-profile illumination devices has a prescribed degree of angular collimation in each of its two orthogonal output meridians and a square or rectangular far field illumination pattern. One form of known illumination device features a single input light emitter and a single square output aperture. A second multi-segment form of the known illumination device deploys one light emitter in each engine segment, so that the total output lumens is determined by the number of segments. Both types of slim illumination devices provide input light collimated in one meridian and comprise a light distributing element that maintains input collimation while collimating output light in the un-collimated orthogonal meridian, in such a manner that the device's far-field output light is collimated in both its orthogonal output meridians. The known illumination device also includes especially structured optical films that process the engine's double-collimated output illumination so as to increase its angular extent in one or both output meridians, with maintenance of the type of beam. Although the known illumination device renders a spatially uniform light beam with sharp cutoff outside the system's adjustable far-field angular cone, it has the disadvantage that adjustment of the pre-set type of beam to a desired type of beam is rather cumbersome and has to be done by internal design, for example by addition of reflectors, and/or angular tilts.

SUMMARY OF THE INVENTION

It is an object of the invention to provide an illumination device of the type as described in the opening paragraph in which at least one of the abovementioned disadvantages is counteracted. To achieve this, the illumination device is characterized in that at least a second compartment is provided in which at least one prismatic sheet is turned with its grooved side towards the light emission window. It has already been disclosed by known illumination systems that the crossed prismatic sheets are arranged so as to face, with their grooved sides, i.e. the sides where prismatically shaped grooves are present, away from the light emission window. This results, due to the way in which the light propagates through the prismatic sheets and is refracted thereby, in an illumination device which issues a single light beam with a relatively small apex angle. By flipping over the prismatic sheet so that it faces with its grooved side towards the light emission window, instead of a single light beam with a relatively small apex angle, an elongated, "hollow", batwing-shaped light beam is obtained. In the batwing-shaped beam, light is issued at relatively large angles to the central axis, hardly any light being issued at small angles to the central axis. For the sake of clarity, the orientation of the crossed prismatic sheets is such that the major faces of the prismatic sheets, i.e. the smooth side and the grooved side, extend mutually parallel. Furthermore, crossed in this respect means that the length direction of the grooves of the prismatic sheets mutually extend at an angle $\alpha$, $\alpha$ being in the range of $30°<=\alpha<=90°$. Viewed in cross section, the grooves have a triangular shape with a top angle of about 90°, however said top angle could be in the range of 70 to 110°, not excluding other top angles. A top angle of 90°, however, is very effective for generating various types of beam.

When the illumination device has two compartments, with mutually different orientations of the prismatic sheets for the compartments, the light beams issued from the compartments are mutually different. For example, in the first compartment, both crossed prismatic sheets face with their smooth sides towards the light emission window, and in the second compartment at least one of the two crossed prismatic sheets faces with its grooved side towards the light emission window. If the light sources in both compartments are independently controllable, a user can easily opt for a single light beam with a relatively small apex angle, or for an elongated "hollow", batwing-shaped light beam, or for an elongated "filled", batwing-shaped light beam. Thus, different types of light beam to be issued by the illumination device can be easily set.

It is clear that when the illumination device has three or more compartments, for example four, six, or twenty, each with their respective stack of crossed prismatic sheets, a number of combinations of orientations and crossed positions, at an angle a of the prismatic sheets, are possible, each combination causing the illumination device to issue a specific light beam during operation. With the light sources of the compartments being independently controllable, the type of beam with the desired shape of the beam to be issued by the illumination device can easily be selected from the relatively large number of beam possibilities.

For example, it is possible to provide two compartments with prismatic sheets such that in each compartment one sheet faces with its grooved side towards the light emission window, the stack of sheets in the second compartment and the third compartment being mutually rotated through 90° around a rotation axis that extends parallel to the central axis. The prismatic sheets in the first compartment both face with their smooth sides towards the light emission window. With independently controllable compartments in such an illumination device, a user can easily opt for a number of beam types, i.e.:
issued by the first compartment only;
an elongated "hollow", batwing-shaped light beam in a first direction issued by the second compartment only;
an elongated "hollow", batwing-shaped light beam in a second direction issued by the third compartment only;

an elongated "filled" batwing-shaped light beam in the first direction issued by the combination of the first and second compartment;

an elongated "filled" batwing-shaped light beam in the second direction issued by the combination of the first and third compartment;

a relatively large, more or less circular "hollow" light beam issued by the combination of the second and third compartment;

a relatively large, more or less circular "filled" light beam issued by the combination of all three compartments if the stack of sheets in the second compartment and the third compartment are mutually rotated through 90°.

An alternative embodiment of the illumination device is characterized in that the stack of prismatic sheets of the second compartment comprises at least three sheets, two of the prismatic sheets being crossed and turned with their respective grooved side towards the light emission window. During operation, the first compartment then issues a single light beam with a relatively small apex angle, and the second compartment issues a relatively large, more or less circular, "hollow" light beam. Possible types of beams obtainable by the illumination device then include a single light beam with a relatively small apex angle, a relatively large, more or less circular, "hollow" light beam, and a relatively large, more or less circular "filled" light beam. Such an illumination device has the advantage that it can issue various types of circular beams and that it is still relatively cheap.

Typically, said sheets are BEF-sheets (Brightness-Enhancement-Films) as manufactured by 3M. In this illumination device, said BEF-sheets are very suitable to replace MLO-plates (micro lens optics plate), generally applied in luminaires, and since the BEF are much easier and cheaper to manufacture than MLO-plates, a reduction in costs compared to conventional luminaires is attained. The illumination device can either be of a side-lit type or direct-lit type, i.e. with the light source opposite the light emission window. In the case of a side-lit illumination device, the light from the light source is coupled into a waveguide in which the light is mixed. Preferably, the waveguide, for example, is tapered and/or provided with well-defined density gradient or light extraction means to more homogeneously couple out the light towards the prismatic sheets. In the case of a direct-lit illumination device, it is an advantage that the light from the light source preferably is issued in a homogeneous way. This can be attained, for example, when the light source is a plurality of LEDS, by evenly distributing the LEDs along the major surfaces of the prismatic sheet, and/or by providing a diffuser film in between the light source and the stack of prismatic sheets or in between the stack of sheets and the light emission window. By providing diffusers at both sides of the stack of prismatic sheets, the homogeneity of the light issued from the illumination device is yet further improved.

An embodiment of the illumination device is characterized in that the first compartment is closely fitted in between the second and the third compartment. Preferably, the illumination device is characterized in that the first compartment is enclosed by the second and the third compartment, the second and the third compartment being congruently shaped and/or positioned so as to be each other's mirror image. Although the shape of the individual compartments or combined compartments can be chosen without restraint, it is advantageous for the three compartments to have the appearance of a unity when the compartments closely fit, instead of two, three or more separate illumination devices when the compartments do not closely fit. Not only the shape of each compartment can be freely chosen, also the combination of closely fitted compartments can have any desired shape. Furthermore, the first compartment issuing the single light beam with a relatively small apex and being positioned in between the second and third compartment is then more or less best positioned to fill an optical gap possibly present in the light beams issued by the second and third compartments. The second and third compartment, being congruently shaped, render a cheaper illumination device which is simpler to assemble, because of the reduced number of different parts of the illumination device.

An embodiment of the illumination device is characterized in that each compartment is provided with a light-transmissible plate positioned in its respective light emission window and facing with a first side towards the exterior and with a second side towards the interior of the housing. The plate protects the prismatic sheets or the diffuser from being accidentally damaged by users or objects moving in the proximity of the illumination device. Preferably, the respective plates of each compartment together are formed into one integral plate so as to reduce manufacture and assembly costs and make the illumination device look more like one unit.

An embodiment of the illumination device is characterized in that the compartments are mutually separated by a light reflective wall or light reflective walls. Thus, the efficacy of the illumination device is improved. Preferably, the light reflective wall is diffusely reflective, thus contributing to a more homogeneous light output by the compartment. The efficacy of the illumination device can be 80% or higher when the reflectance of the compartment is 98% or more, for example using MCPET from Furakawa company.

The invention further relates to a luminaire comprising an illumination device according to the invention. Such a luminaire could comprise one or more inventive illumination devices and is further provided with means which enable easy mounting of the luminaire in, for example, offices, waiting rooms, entrance halls etc. The invention yet further relates to a lighting system comprising a control unit and at least one luminaire according to the invention. The control unit preferably is a remote control unit, in which case the luminaire should be provided with a receiver and processor to receive and adequately act on the signal received from the remote control unit. By means of the control unit, the light beam settings are easily set.

BRIEF DESCRIPTION OF THE DRAWINGS

The invention will now be further elucidated by means of the schematic drawings, in which.

DETAILED DESCRIPTION OF THE PREFERRED EMBODIMENTS

Figure 1:
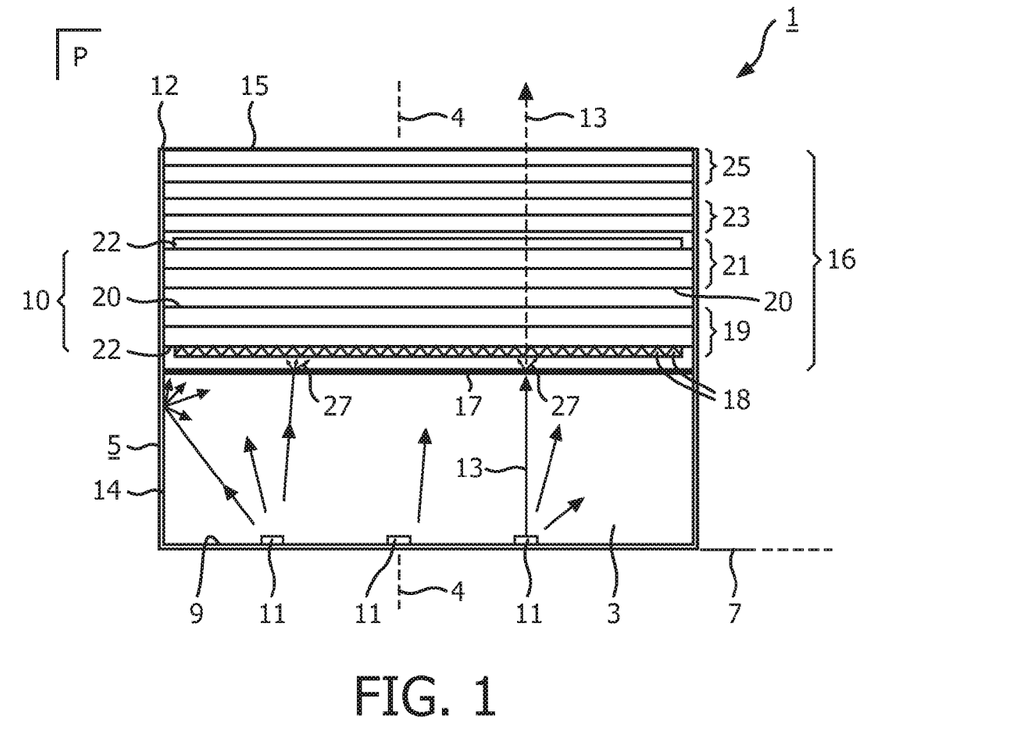
FIG. 1 shows a cross section of a compartment of an illumination device according to the invention.

FIG. 1 shows a cross section of a first compartment 3, which is a typical example for other compartments, of an illumination device 1 according to the invention. The compartment 3 is accommodated in a housing 5 with a wall 7. The compartment has a carrier 9 for a light source 11, in the figure a plurality of white light emitting LEDs, but alternatively the light source is at least one halogen incandescent lamp, a HID lamp, or a low pressure mercury discharge lamp, for example a TL or a compact fluorescent lamp. Light issued by the LEDs during operation propagates downstream, i.e. away from the light source towards a light emission window 15 which is bordered by an outer edge 12 of the compartment. The light propagates along a light path 13 and substantially along a central axis 4. Starting from the LEDs and going downstream along the light path, the light subsequently crosses a stack of layers 16 comprising successively a first diffuser 17, a stack 10 of a first prismatic sheet 19 and a second prismatic sheet 21, a second diffuser 23 and a transparent plate 25 which is positioned in the light emission window. The first prismatic sheet and second prismatic sheet are in a crossed position with respect to each other, the first prismatic sheet being turned with a smooth side 20 towards the light emission window and with a grooved side 22 towards the LEDs, the second prismatic sheet being turned with its grooved side 22 towards the light emission window and with its smooth side 20 towards the LEDs. The grooved side comprises a plurality of parallel extending grooves 18, the grooves in the first prismatic sheet extend perpendicularly to plane P of the drawing, while the grooves of the second prismatic sheet extend parallel to plane P. Light rays incident on a light-ray-reflective compartment wall 14 are diffusely reflected, thus contributing to a more uniform beam as issued from the compartment of the illumination device. Light rays incident on the first diffuser, in the Figure a "classic" LCD diffuser film, are scattered, as shown by scatter patterns 27, to contribute to a more uniform beam. The prismatic sheets contribute to the desired shape of the beam, and the second diffuser, like the first diffuser, contributes to a more uniform beam. The transparent plate is optionally provided, but serves in particular for ease of cleaning and for protection purposes, for example to protect against damages or dust.

Figure 2A:
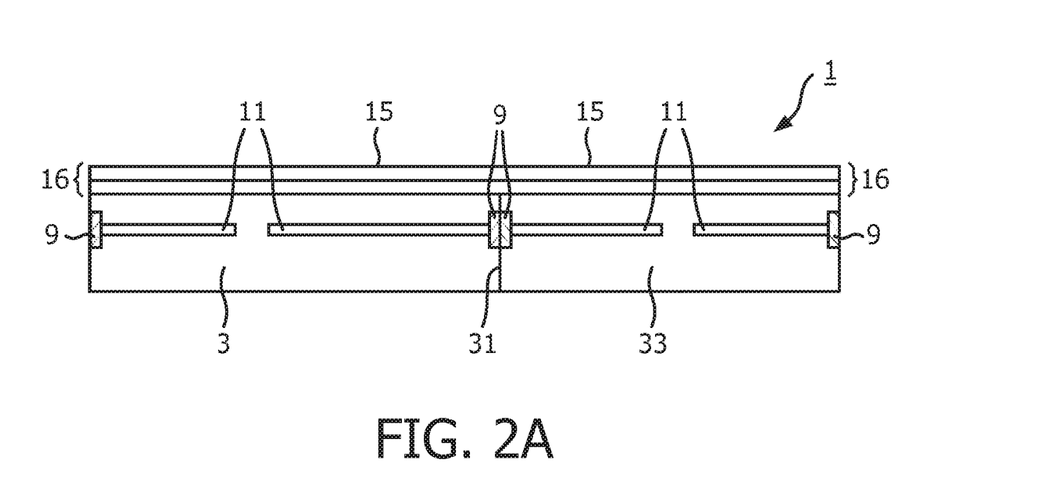
FIG. 2A shows a side view of a first embodiment of an illumination device according to the invention comprising a first and a second compartment.

FIG. 2A shows a side view of a first embodiment of an illumination device 1 according to the invention comprising a first 3 and a second compartment 33, which are separated by a diffuse light ray-reflective separation wall 31. Each compartment has its respective light emission window 15, independently operable light source 11, and stack of layers 16. The light sources in the Figure are compact fluorescent lamps accommodated in carriers 9. The stack of layers of the first compartment comprises two crossed prismatic sheets of which the first prismatic sheet is turned with its grooved side towards the light emission window and the second prismatic sheet is turned with its smooth side towards the light emission window. The stack of layers of the second compartment comprises two crossed prismatic sheets, both of which are turned with their smooth side towards the light emission window.

Figure 2B:
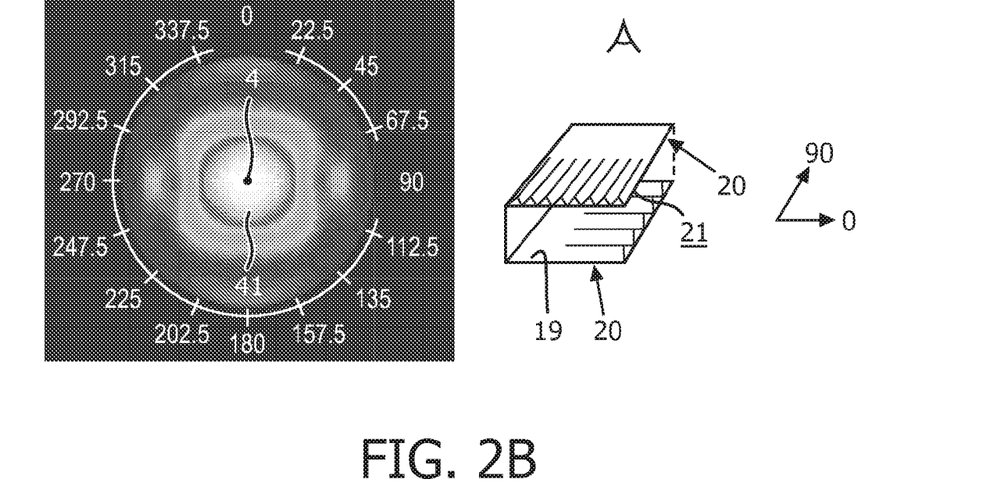
FIGS. 2B-C show light beams issued by the illumination device of FIG. 2A and the operation of either the first or the second compartment.
Figure 2C:
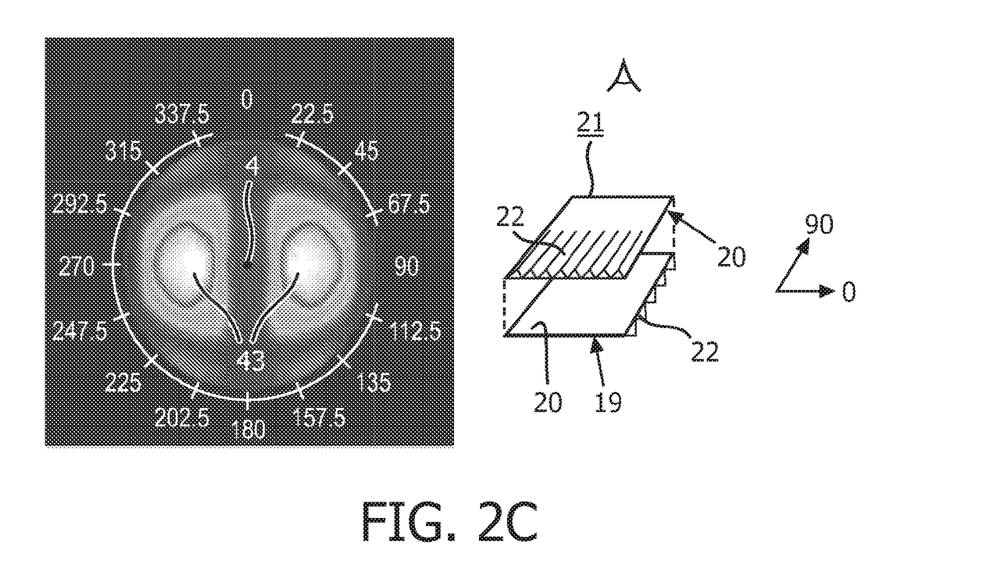

FIGS. 2B-C show light beams as issued by the illumination device of FIG. 2A during operation of either the first or the second compartment. In FIG. 2B, the two crossed prismatic sheets 19, 21 have both the same orientation, i.e. are both turned with their smooth side 20 towards the light emission window, as shown in the right part of FIG. 2B. This orientation results in a single light beam 41 along the central axis 4, with a relatively small apex angle, as indicated in the left part of FIG. 2B. In FIG. 2C, the two crossed prismatic sheets 19, 21 have a mutually different orientation, i.e. one prismatic sheet is turned with its smooth side 20 towards the light emission window, and the other prismatic sheet is turned with its grooved side 22 towards the light emission window, as shown in the right part of FIG. 2C. This orientation results in a batwing-shaped light beam 43, which is issued at relatively large angles to the central axis 4, and hardly any light at small angles to the central axis, as indicated in the left part of FIG. 2C.

Figure 3A:
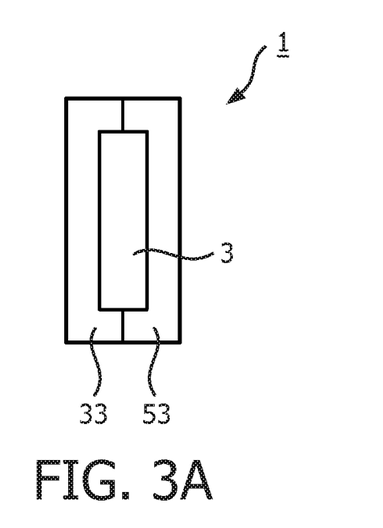
FIGS. 3A-D show illumination devices with various combinations of mutual positions and shapes of three or more compartments.
Figure 3B:
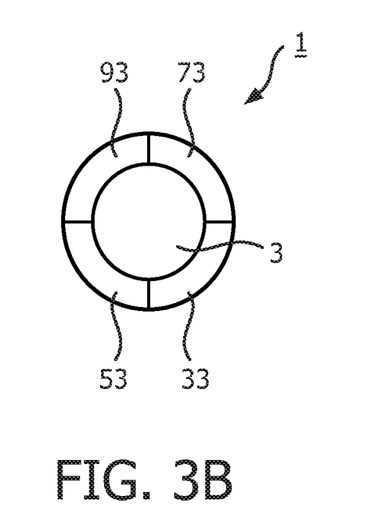
Figure 3C:
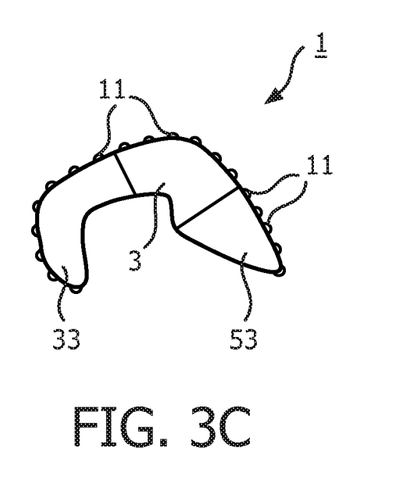
Figure 3D:
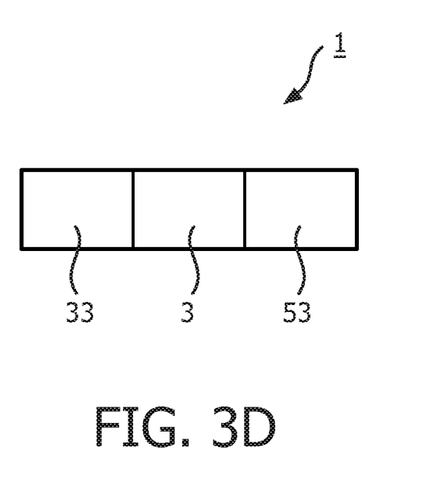

FIGS. 3A-D show illumination devices 1 with various combinations of mutual positions and shapes of compartments 3, 33, 53, 73, 93. In FIG. 3A, a first compartment 3 is enclosed in between a second 33 and a third compartment 53 in such a way that said three compartments are integrally formed and together built up a luminaire. In FIG. 3B, a first compartment 3 is enclosed in between a second 33, a third 53, a fourth 73, and a fifth 93 compartment, each compartment having its own stack of sheet and independently operable light source. Preferably, the first compartment 3, also indicated as central compartment, issues a single light beam with a small apex angle, and the second 33, third 53, fourth 73 and fifth compartment 93, also indicated as side compartments, all issue a batwing-shaped light beam at relatively large angles to the central axis. In FIGS. 3C-3D, the first compartment 3 is closely fitted in between a second 33 and a third compartment 53. In FIG. 3C, the compartments have a free-formed shape, while in FIG. 3D the first, the second and the third compartment are congruently shaped, with the second and the third compartment being positioned so as to be each other's mirror image. FIG. 3C shows a side-lit illumination device 1 with light source 11, LEDs in FIG. 3C, mounted to the wall of the housing. As a result of the orientation given to the prismatic sheets, the orientation of the batwing-shaped light beams as issued from both side compartments may be oriented so as to be mutually parallel, but alternatively may be oriented so as to be mutually transverse, which is the case in FIG. 3D, or at angles a, in which case a is in the range of 30° to 90°.

Figure 3E:
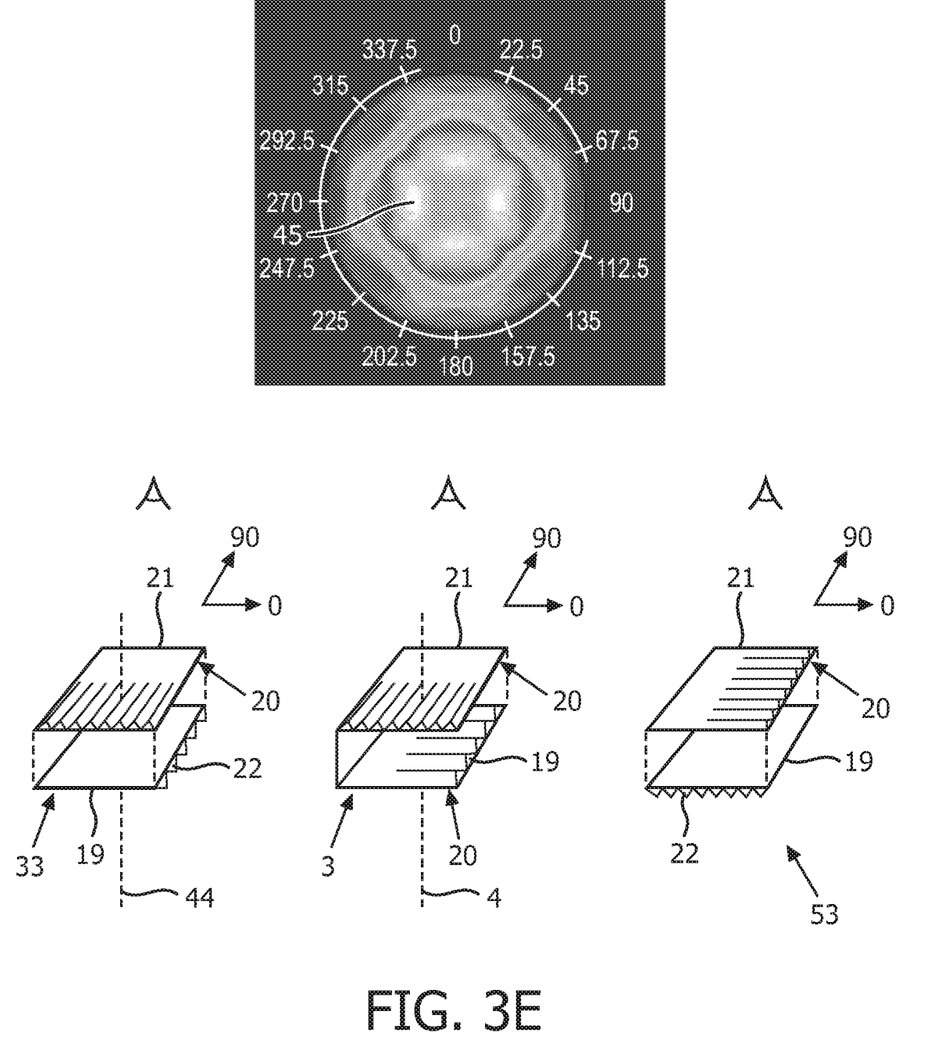
FIGS. 3E-3F show light beams issued by the illumination device of FIG. 3D and the operation of all three compartments and of two compartments, respectively.
Figure 3F:
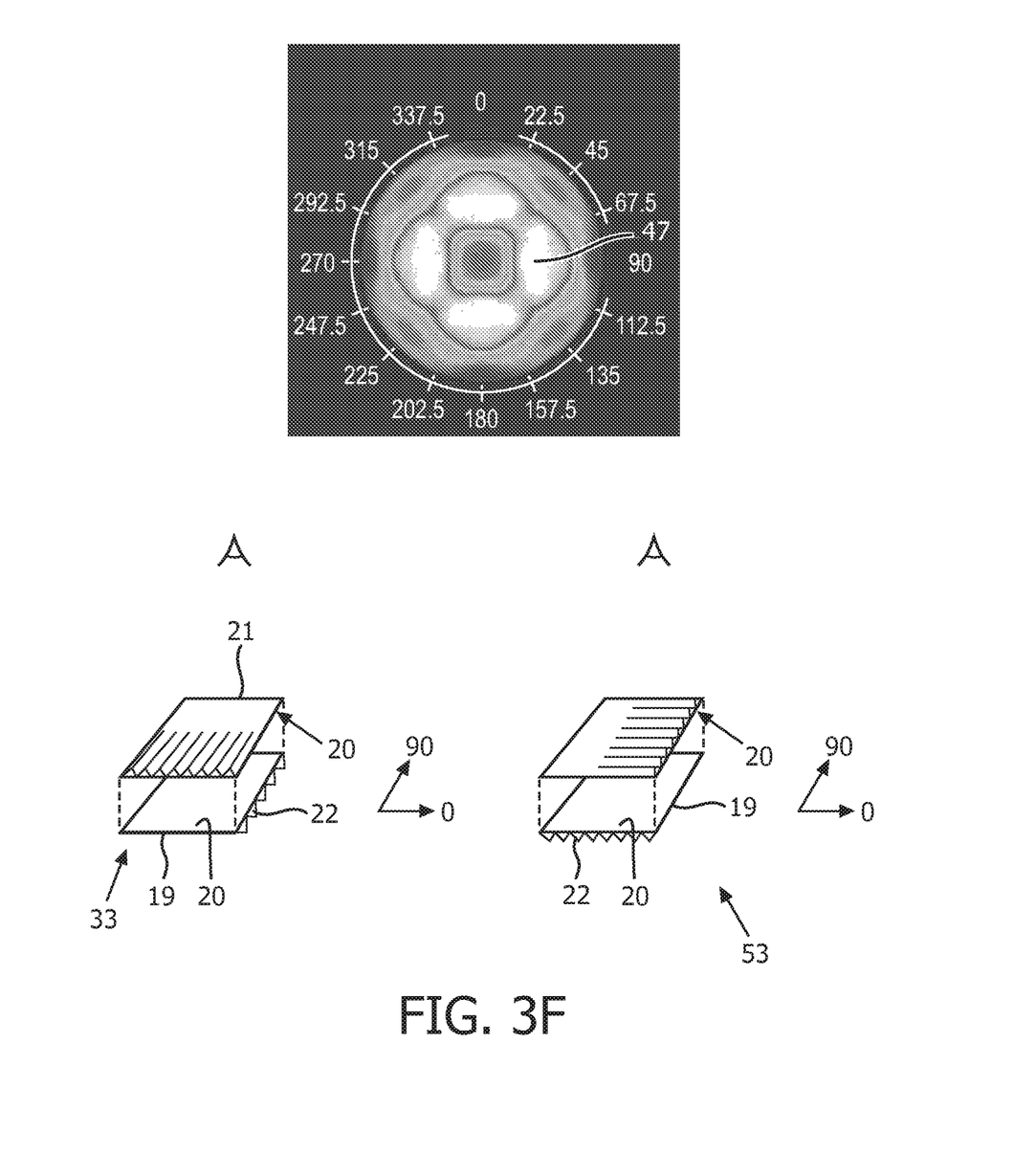

FIGS. 3E-3F respectively show light beams issued by the illumination device of FIG. 3D, and the operation of all three compartments 3, 33, 53 and of only the two side compartments 33, 53, respectively. The two side compartments 33, 53 each have prismatic sheets, of which in each compartment one sheet faces the light emission window with its grooved side 22, said prismatic sheets 19, 21 in the second compartment 33 being rotated through 90° around a rotation axis 44 (that extends parallel to the central axis 4) with respect to the prismatic sheets 19, 21 of the third compartment 53. The prismatic sheets 19, 21 in the first compartment 3 both face with their smooth sides 20 towards the light emission window. With independently operable compartments, a user can easily opt for a number of beam types as shown in FIG. 3E where all three compartments are in operation, i.e. a relatively large, more or less circular "filled" light beam 45 is issued by the illumination device, and as shown in FIG. 3F where only the two side compartments are in operation and a relatively large, more or less circular "hollow" light beam 47 is issued by the illumination device.

The invention claimed is:

1. An illumination device comprising a housing with at least a first compartment and a second compartment, the first compartment comprising:
  a light emission window bordered by an outer edge of the compartment;
  a carrier for at least one light source;
  a stack of crossed prismatic sheets positioned in the housing, each sheet having a smooth side and a grooved side;
  wherein light issued by the tight source during operation is made to propagate along a light path, said light path extending from the light source through the prismatic sheets and subsequently through the light emission window at least partially along a central axis transverse to the light emission window, both prismatic sheets being turned with the smooth side towards the light emission window, and wherein, in the second compartment, at least one prismatic sheet is turned with its grooved side towards the light emission window.

2. The illumination device as claimed in claim 1, wherein a third compartment is provided.

3. The illumination device as claimed in claim 2, wherein both in the second and third compartment one prismatic sheet is turned with its grooved side towards the light emission window.

4. The illumination device as claimed in claim 3, wherein the stack of crossed prismatic sheets in the second compartment and the stack of crossed prismatic sheets in the third compartment are mutually rotated through 90° around a rotation axis that extends parallel to the central axis.

5. The illumination device as claimed in claim 4, wherein the first compartment is closely fitted in between the second and the third compartment.

6. The illumination device as claimed in claim 5, wherein the first compartment is enclosed by the second and third compartment, the second and third compartment being congruently shaped and positioned so as to be each other's mirror image.

7. The illumination device as claimed in claim 1, wherein the stack of prismatic sheets of the second compartment comprises at least three sheets, two of the prismatic sheets are crossed and are turned with their respective grooved side towards the light emission window.

8. The illumination device as claimed in claim 1, wherein a difffuser is provided at one side or at both sides of the stack of prismatic sheets.

9. The illumination device as claimed in claim 1, wherein the light source of each compartment is separately switchable.

10. The illumination device as claimed in claim 1, wherein each compartment is provided with a light-transmissible plate positioned in its respective light emission window and facing with a first side towards the exterior and with a second side towards the interior of the housing.

11. The illumination device as claimed in claim 10, wherein the respective plates of each compartment together are formed into one integral plate.

12. The illumination device as claimed in claim 1, wherein the compartments are mutually separated by a light reflective wall.

\* \* \* \* \*